United States Patent [19]
Houben et al.

[11] Patent Number: 5,809,655
[45] Date of Patent: Sep. 22, 1998

[54] APPARATUS FOR CUTTING OF PLANTS

[75] Inventors: Jan P. Houben, Chicago, Ill.; Bob Jung, Bergen op Zoom, Netherlands

[73] Assignee: Robert Bosch GmbH, Stuttgart, Germany

[21] Appl. No.: 732,236

[22] PCT Filed: Mar. 27, 1995

[86] PCT No.: PCT/DE95/00413

§ 371 Date: Dec. 12, 1996

§ 102(e) Date: Dec. 12, 1996

[87] PCT Pub. No.: WO95/26624

PCT Pub. Date: Oct. 12, 1995

[30] Foreign Application Priority Data

Mar. 30, 1994 [DE] Germany ............................ 44 11 001.4

[51] Int. Cl.⁶ ............................................... A01D 34/67
[52] U.S. Cl. ................................................ 30/276; 30/347
[58] Field of Search ........................ 30/276, 347; 56/12.5

[56] References Cited

U.S. PATENT DOCUMENTS

| | | | |
|---|---|---|---|
| 4,202,094 | 5/1980 | Kalmar | 30/276 |
| 4,490,910 | 1/1985 | Mattson et al. | 30/276 |
| 4,640,084 | 2/1987 | Baba | 30/276 X |
| 4,866,846 | 9/1989 | Hoffmann et al. | 30/276 |
| 5,020,223 | 6/1991 | Desent et al. | 30/276 |
| 5,461,787 | 10/1995 | Araki et al. | 30/276 |

*Primary Examiner*—Douglas D. Watts
*Attorney, Agent, or Firm*—Michael J. Striker

[57] ABSTRACT

The apparatus for cutting plants includes a rotatable spool (18) having a central hub (29) and a plurality of axially spaced-apart disks (23,24,25) extending from the central hub so as to define at least one winding chamber (26,27); at least one winding (19,20) around the central hub in the at least one winding chamber (26,27) including at least one cutting filament with a free end extending radially outward through at least one radial opening (13,15) in the cup; a cup (16) nonrotatably connected with a drive shaft (14) in which the spool (18) is rotatably mounted; and a device for readjusting the cutting filament to a predetermined length when the cutting filament has been shortened due to wear including an elastic ring (30,40) for each winding, which encompasses and presses together the winding during cutting at normal rotational speed and a device for rotating the drive shaft and cup at an elevated rotational speed relative to a normal rotational speed used during cutting. The two elastic legs (32,33,42,43) of each elastic ring (30,40) advantageously have an elasticity such that the two elastic legs (32,33,42,43) are released from engagement with the winding (19,20) at the elevated rotational speed for filament readjustment but engage and restrain the winding (19,20) at normal rotational speed.

14 Claims, 4 Drawing Sheets

APPARATUS FOR CUTTING OF PLANTS

BACKGROUND OF THE INVENTION

The invention relates to an apparatus for cutting of plants and, more particularly, to an apparatus for cutting of plants having at least one free end of a cutting filament which rotates about a rotational axis and protrudes radially outward from it, defining a cutting plane, and which forms a winding in a winding chamber of a spool, which chamber is defined by axially spaced-apart disks disposed on a central hub; a cup nonrotatably mounted on a drive shaft in which the spool is rotatably mounted and which is provided with at least one throughgoing opening through which the cutting filament passes radially, the cutting filament being readjustable to a certain predetermined length, especially when wear has shortened it.

An apparatus for cutting plants, in which a spool that carries a cutting filament has a flexible strip, on its circumference, that is embodied as a closed ring, is described in German Utility Model DE-GM 69 38 265. The closed ring loosely surrounds the cutting filament winding and is spaced apart radially from it. The ring has a continuous radial opening whose edge closely surrounds the cutting filament passed through it. The task of the ring is to prevent independent unwinding of the cutting filament, and especially of its free end, from the spool and to prevent slipping radially back into the winding chamber, so that a length of cutting filament always protrudes radially out of the spool and is accessible to manual or automatic length adjustment.

The closed ring can be slipped on the spool only axially, but not radially, and the cutting filament must be threaded relatively inconveniently through the central opening of the ring. The ring does not rest directly on the winding and under tension, but instead is braced on the spool body.

U.S. Pat. No. 4,104,796 discloses another apparatus for cutting plants, in which the length of the free end of the cutting filament is automatically regulated by centrifugal force.

When the cutting filament rotates, that is, when the engine is running, the centrifugal force regulation begins whenever a portion of the free end of the cutting filament is torn off because of wear. The shortening of the cutting filament changes the airflow resistance and the mass moment of inertia of the spool, and correspondingly its rpm, as well. The increased centrifugal force then acts on the free end of the filament, pulls the cutting filament radially outward and seeks to rotate the spool relative to the housing. This trips centrifugal force-actuated locking means, which release the spool from its surrounding housing, so that the spool can rotate relative to the housing by a certain angular amount. This rotation lengthens the free end of the cutting filament radially outward. These steps of automatic readjustment of the cutting filament are repeated as often as needed until the free end of the cutting filament reaches a certain specified minimum length. At this minimum length, the mass inertia and air flow resistance are so great that the rpm drops, and consequently the centrifugal force is too slight to release the locking means.

In the automatic readjustment of the filament, unintended changes in the moment of mass inertia of the filament spool can impede readjustment of the cutting filament. This can happen for instance if, because of the change in rpm, the spool winding shifts in the winding chamber, in other words shifts radially or axially, during the filament readjustment. As a result, the mass distribution on the spool changes. Moreover, under some circumstances, some layers of the spool winding can become jammed, so that the cutting filament cannot be readjusted at all or only with insufficient length. This makes the cutting performance of the apparatus unsatisfactory.

SUMMARY OF THE INVENTION

It is an object of the present invention to provide an apparatus for cutting plants of the above-described type, which does not have the above-described disadvantages.

According to the invention the apparatus for cutting plants comprises a spool rotatable about a rotation axis which includes a central hub and a plurality of axially spaced-apart disks extending from the central hub so as to define at least one winding chamber; at least one winding located in the at least one winding chamber, each of the at least one winding including a cutting filament having a free end extending radially outward; a cup nonrotatably connected with a drive shaft, the spool with the at least one winding being rotatably mounted in the cup and the cup being provided with at least one lateral radial opening, the cutting filament passing through and extending from the at least one radial opening of the cup; and means for readjusting the cutting filament to a predetermined length when the cutting filament has been shortened due to wear, which include at least one elastic ring for the at least one winding, the at least one elastic ring encompassing and pressing together the at least one winding of the at least one cutting filament.

The apparatus according to the invention for cutting plants has the advantage that the filament winding in the winding chamber does not change position in the winding chamber during automatic filament readjustment, for instance from changes in rpm or even from being shaken during transporting.

Because of the tong-like compression of the winding by the open ring, the forces of friction on the unspooling layers of cutting filament remain relatively high at normal spool rpm and decrease at higher rpm, because then the legs strive to open in response to the higher centrifugal force.

As a result, the automatic filament readjustment that occurs at higher rpm is especially smooth and free of malfunction. The cutting filament is likewise prevented from slipping back into the spool by the action of the open ring.

Especially advantageously, the spool of the invention is mountable in machine-automated fashion, because the open ring can be slipped onto the spool radially, instead of axially as in the prior art. The function of the apparatus is improved because the cutting filament is guided smoothly through the wide central opening in the ring. Manipulation on introducing a new cutting filament or a new spool into the apparatus is improved because the cutting filament can be introduced radially through a slit in the circumference of the ring, into the central opening thereof.

In a preferred embodiment of the invention two windings are provided in two winding chambers with two elastic rings. In this embodiment the apparatus for cutting plants includes a spool rotatable about a rotation axis with a central hub and three axially spaced-apart disks extending from the central hub so as to define two winding chambers; a winding around the central hub located in each winding chamber, each winding comprising a cutting filament having a free end extending radially outward; a cup nonrotatably connected with a drive shaft and provided with two lateral radial openings on opposite sides of the cup, wherein the spool is rotatably mounted in the cup and the cutting filaments pass through and extend from respective radial openings and means for readjusting the cutting filament or filaments to a predetermined length when shortening due to wear has occurred. The means for readjusting includes one elastic ring engaged around one winding in the spool, the one elastic ring having two elastic legs and a middle portion between the two elastic legs provided with a throughgoing opening through which the free end of the one winding passes and another elastic ring engaged around the other of the two windings, the other elastic ring having two elastic legs and a middle portion between the two elastic legs provided with another throughgoing opening through which the free end of the other winding passes, and means for rotating the drive shaft and the cup at an elevated rpm relative to a normal rpm used during cutting. The two elastic legs of each elastic rings have an elasticity such that the two elastic legs are released from engagement with the windings at elevated rpm for filament readjustment but engage and restrain the windings at normal rpm.

Preferably the elastic rings are axially braced with the at least two elastic legs between the disks defining the winding chambers with so little axial play that the elastic rings are secured against tilting. The elastic rings are provided with tubular protrusions around the throughgoing openings and the elastic rings engage around the windings in the spool with the tubular protrusions in respective ones of the radial openings in the cup.

Further advantages of the invention will become apparent from further features set forth in dependent claims appended hereinbelow.

BRIEF DESCRIPTION OF THE DRAWING

The objects, features and advantages of the invention will now be illustrated in more detail with the aid of the following description of the preferred embodiments, with reference to the accompanying figures, in which.

DESCRIPTION OF THE PREFERRED EMBODIMENTS

Figure 1:
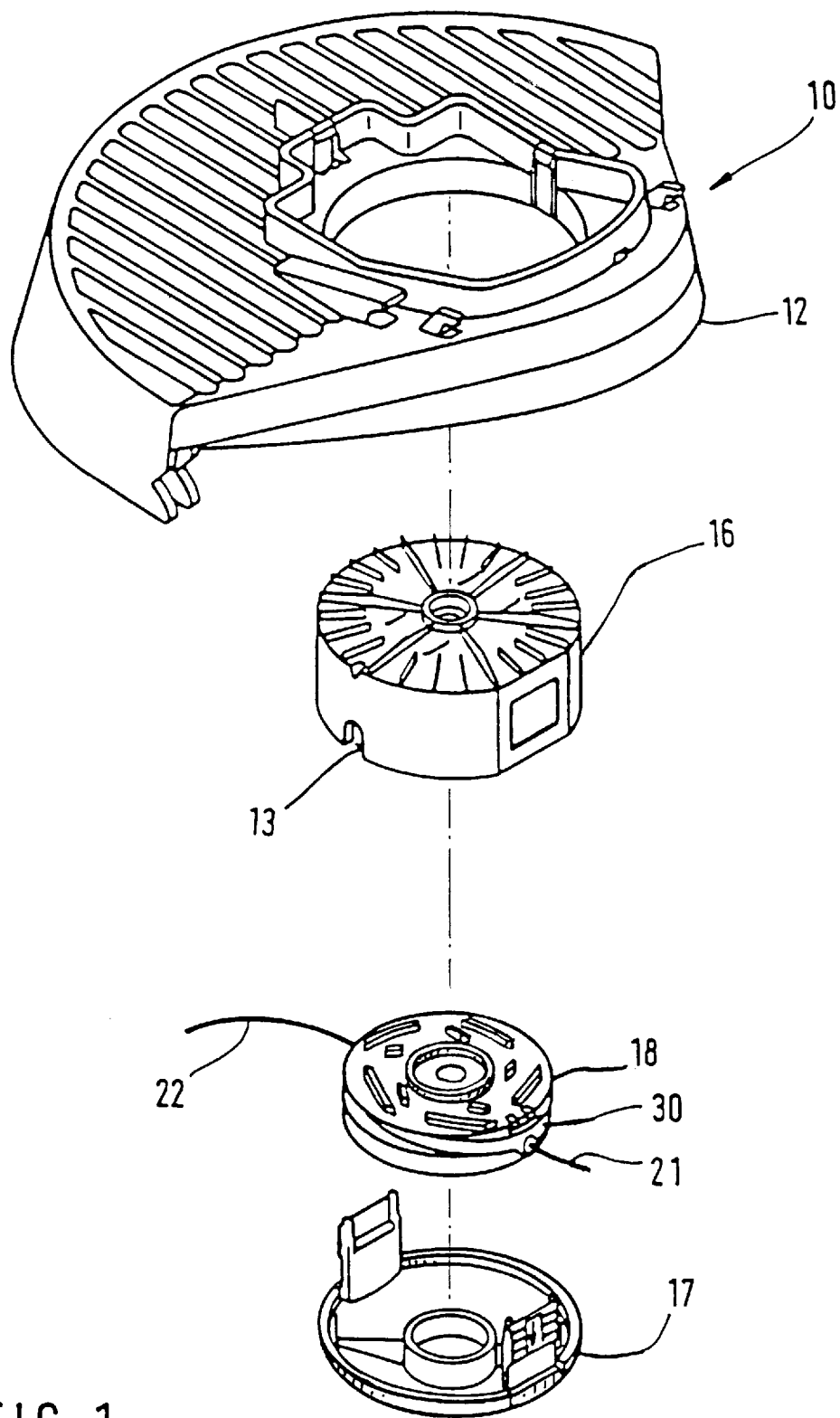
FIG. 1 is an exploded perspective view of a lower portion of one embodiment of an apparatus for cutting plants according to the invention.

A lower housing part 12 of the apparatus 10 for cutting plants, a housing embodied as a cup 16 with one of its two radial openings 13, 15 for the passage therethrough of cutting filaments 21, 22, a spool 18 with the radially outward-protruding cutting filaments 21, 22, and one of two rings 30, 40 in axial order from top to bottom are shown in FIG. 1. A cap 17 can also be seen, which secures the spool 18 against falling from the cup 16 and also protects against the entry of dirt and moisture into the cup 16.

Figure 2:
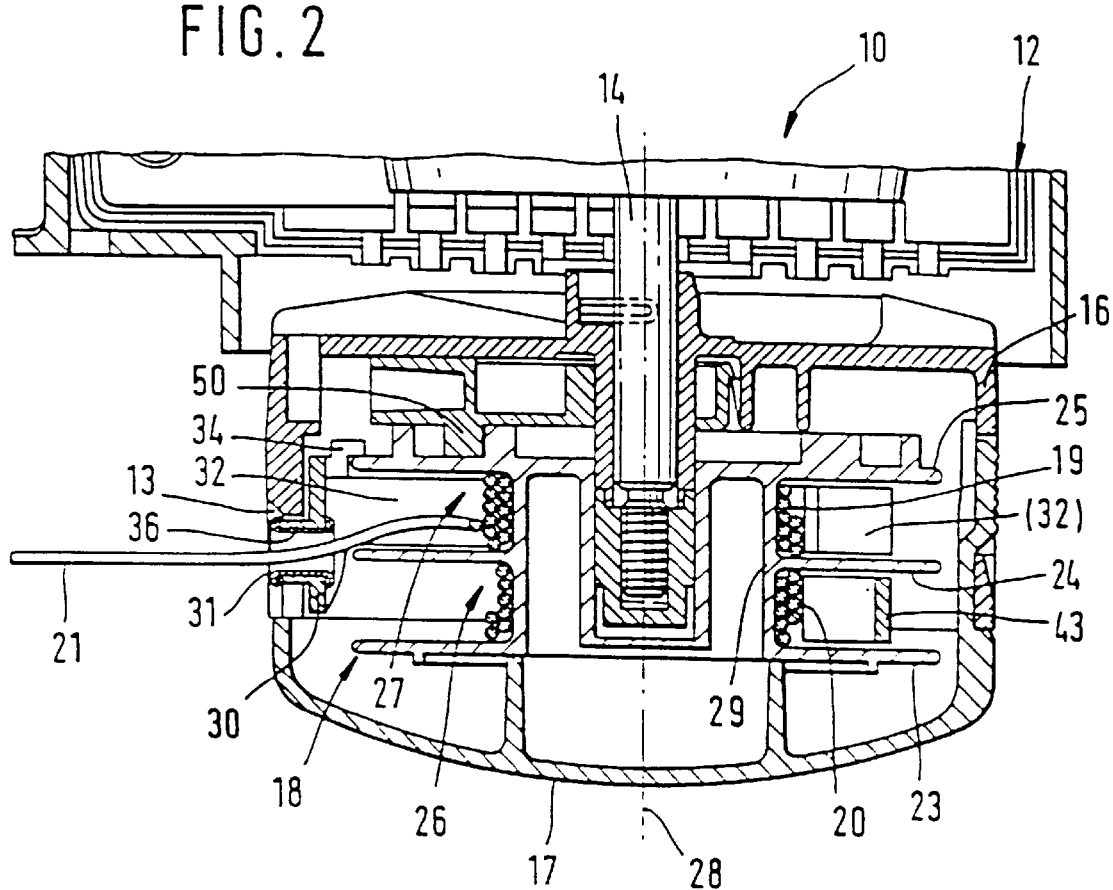
FIG. 2 is a side cross-sectional view through the apparatus of FIG. 1 taken along the section line II—II of FIG. 6 showing the filament spool in the housing.

The side cross-sectional view of FIG. 2 shows the lower region of the apparatus 10 with the housing part 12, a drive shaft 14, which in a manner fixed against relative rotation carries a cup 16 in which a spool 18 is rotatably supported in the middle. The spool carries two windings 19, 20 of two cutting filaments 21, 22 respectively.

The spool 18 comprises three axially evenly spaced apart disks 23, 24, 25, which together with a hub 29 form a first and second winding chamber 26, 27. These chambers receive the respective windings 19, 20. A first open ring 30 is inserted radially into the upper second winding chamber 27 from the left in FIG. 2—between the disks 23, 24. Its legs 32, 33 surround the winding 19 in tong-like fashion and are braced on the circumference of the winding. In the first winding chamber 26, disposed under the second winding chamber 27, analogously to the first ring 30 an identical second ring 40 is braced by legs 42, 43 radially on the second winding 20. The rings 30, 40 each have a central radial throughgoing opening 31, 41. The throughgoing openings 31, 41 are formed by hollow rivets and permit a smooth passage of the cutting filaments 21, 22 through them.

Since FIG. 2 shows a 90° section folded out to 180° (see FIG. 6), only the throughgoing opening 31 of the first ring 30 and only one leg 32 of that ring can be seen. The view of the right-hand half, determined by the axis of symmetry 28, can be imagined as having been rotated back 90° into the plane of the drawing as shown by the section line in FIG. 6. For the same reason, only one leg 43 of the second ring 40 is visible.

The cup 16 is closed with a cap 17, which secures the axial location of the spool 18 or secures it against being lost and prevents the entry of dirt.

A slide 50 is supported on the cup 16 such that it is displaceable but fixed against relative rotation. It is part of a device to provide automatic filament readjustment regulated by centrifugal force and as a function of rpm. It can uncover or block stops, not identified by reference numeral, of the spool 18 by means of cams not identified by reference numeral.

Figure 3:
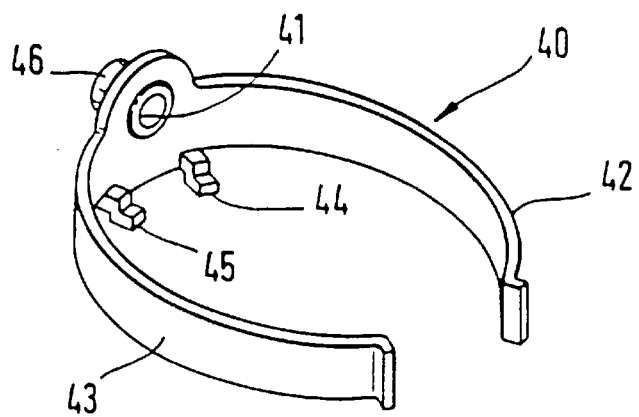
FIG. 3 is a detailed perspective view of an open ring used in the apparatus for cutting plants according to the invention.

In FIG. 3, the second ring 40 is shown as a detail in a perspective view. Its legs 42, 43, the throughgoing opening 41, and the claws 44, 45 are clearly visible. The ends of the legs, not identified by reference numeral, curve outward.

Figure 4:
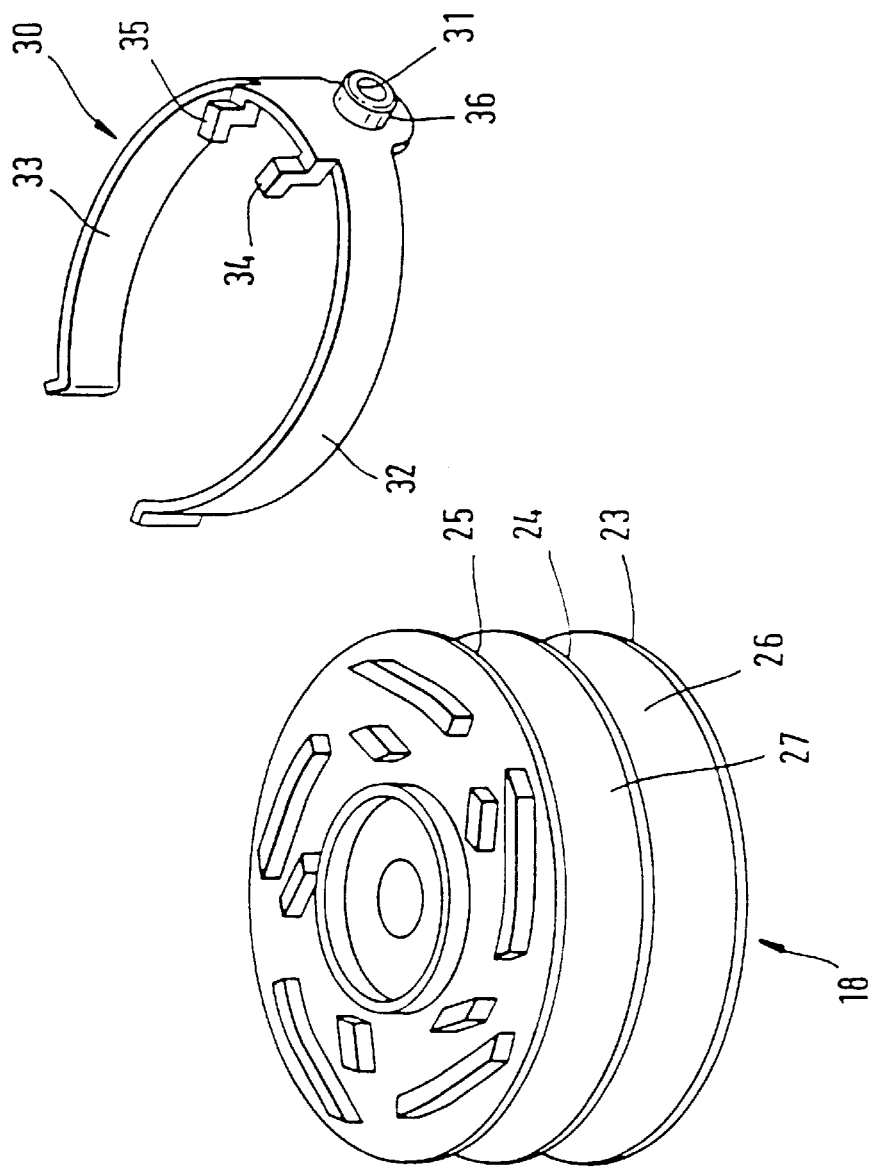
FIG. 4 is an exploded perspective view of a spool of the apparatus according to the invention with two open rings.

In FIG. 4, an exploded view shows the spool 18 with the two rings 30, 40; the disks 23, 24, 25, the winding chambers 26, 27, and the other details of the rings 30, 40 described above, and the legs 32, 33; 42, 43, the throughgoing openings 31, 41, the claws 34, 35; 44, 45, and the tubular protrusions 36, 46. The rings 30, 40 are disposed on the spool 18 in such a way that the throughgoing openings 31, 41 point in diametrically opposite directions for the corresponding passage through them of the cutting filament, not shown here. In this position, the tubular protrusions 36, 46 can be positively restrained or centered in the radial openings 13, 15 of the cup 16.

Figure 5:
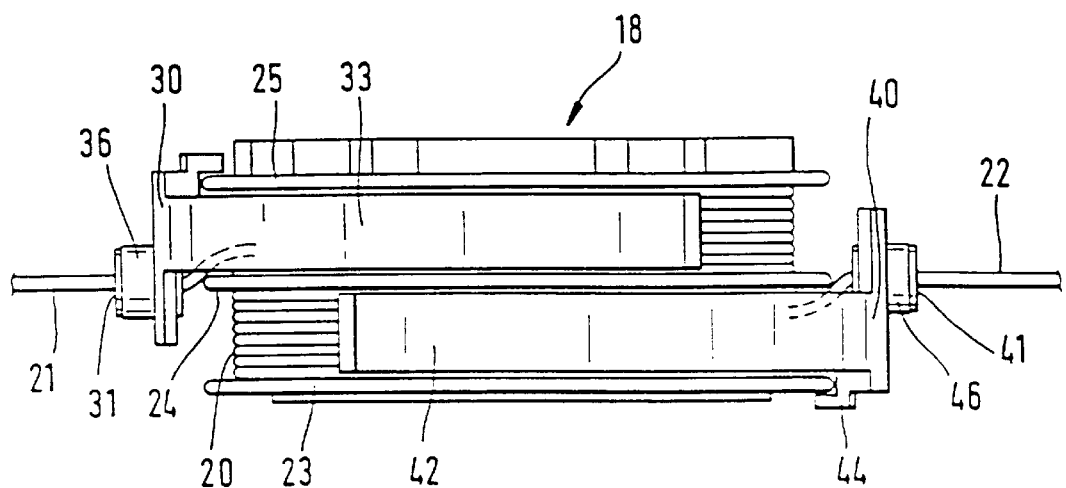
FIG. 5 is a side view of the spool shown in FIG. 4 including with windings and open rings.
Figure 6:
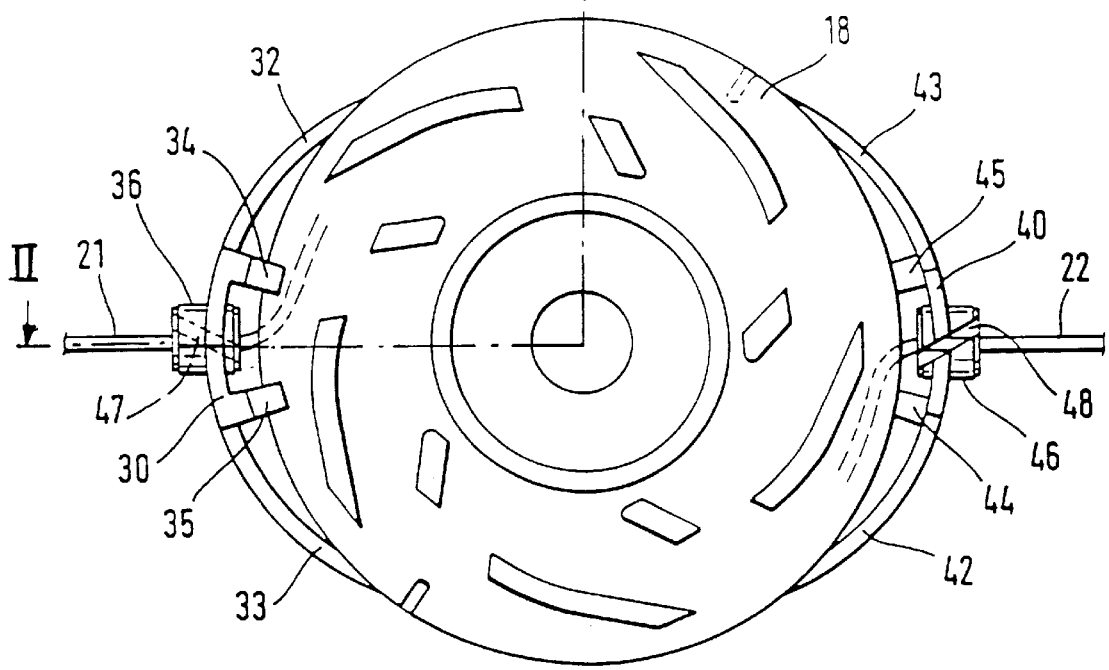
FIG. 6 is a plan view of the device shown in FIG. 5.

FIGS. 5, 6 show the detail of the spool 18 of FIG. 2 in lateral section and plan view, respectively, and the disks 23, 24, 25, the windings 19, 20, and their outward-emerging free ends of the cutting filament 21, 22 can be seen. The disposition of the rings 30, 40 between the disks 23, 24, 25 and the distribution of the claws 34, 35; 44, 45 relative to the disks 23, 25 is clearly visible, as is the tubular protrusion 36, 46 for the passage through it of the cutting filament 21, 22. The ring 30, 40, on the circumference of each of its throughgoing openings 31, 41, has a respective radially continuous, axially oblique slit 47, 48, through which the cutting filament 21, 22 can be conveniently introduced into the throughgoing opening laterally from outside. The free end of the cutting filament 21, 22 is relatively rigid, and because of the rigidity it is secured in the throughgoing opening so that it cannot be lost, because, although it is introduced obliquely by hand, nevertheless it cannot on its own assume the necessary inclined position for reemerging.

The rings 30, 40 are mounted by slipping them radially over the windings. Their legs 32, 33; 42, 43 surround the circumference of the filament windings 19, 20 and are braced resiliently on them. Before the rings 30, 40 are radially slipped on, the free ends of the cutting 31, 41, so that they emerge radially outward. The rings 30, 40 are also pushed radial filaments 21, 22 are inserted through the throughgoing openings ly far enough onto the spool 18 that their claws 34, 35; 44, 45 fit over the disks 23 and 25, respectively, engaging them axially and radially. The spool 18 with the rings 30, 40 is positioned centrally in the cup 16 in such a way that their throughgoing openings 31, 41 positively engage the radial openings 13, 15 of the cup 16.

The rings 30, 40 are dimensioned and calculated such that their legs act upon and brace the windings 19, 20 over the entire possible rpm range of the spool 18. At high rpm, the legs seek to open under centrifugal force, so that the bracing force on the winding and hence the friction on readjustment of the cutting filament—that is, at high rpm becomes less. Because the filament location is secure, optimal frictional force and favorable dynamic performance in the automatic filament readjustment are assured.

Because the rings 30, 40 are braced over the entire width and a relatively large area relative to the spool 18 and relative to the windings 19, 20, canting or jamming of the rings 30, 40 relative to the spool 18 is prevented. This feature also contributes to the safety and reliability of the automatic filament readjustment.

We claim:

1. An apparatus for cutting plants, said apparatus comprising
    a spool (18) rotatable about a rotation axis (28) and comprising a central hub (29) and a plurality of axially spaced-apart disks (23,24,25) extending from said central hub so as to define at least one winding chamber (26,27);
    at least one winding (19,20) located in said at least one winding chamber (26,27), each of said at least one winding including a cutting filament (21,20) having a free end extending radially outward;
    a cup (16) nonrotatably connected with a drive shaft (14), said spool with said at least one winding being rotatably mounted in said cup and said cup being provided with at least one lateral radial opening (13,15), said cutting filament passing through and extending from said at least one radial opening (13,15) of said cup; and
    means for readjusting said cutting filament to a predetermined length when said cutting filament has been shortened due to wear, said means for readjusting including at least one elastic ring (30,40) for said at least one winding, said at least one elastic ring (30,40) encompassing and pressing together said at least one winding.

2. The apparatus as defined in claim 1, wherein each of said at least one elastic ring (30,40) has at least two elastic legs (32,33; 42,43) and a middle portion between said at least two elastic legs (32,33; 42,43) provided with a throughgoing opening (31,41) through which said free end of said cutting filament passes, and said at least one elastic ring (30,40) is braced on said at least one winding (19,20) with said at least two elastic legs (32,33; 42,43).

3. The apparatus as defined in claim 2, wherein each of said at least one elastic ring (30,40) with said at least two elastic legs (32,33; 42,43) is axially restrained between two of said disks (23,24,25) with so little axial play that said at least one elastic ring is secured against tilting.

4. The apparatus as defined in claim 2, wherein each of said at least one elastic ring (30,40) has at least one claw (34, 35; 44, 45) approximately in said middle portion and is braced axially and/or radially on one of said disks (23,24,25) with said at least one claw (34,35; 44,45).

5. The apparatus as defined in claim 2, wherein said at least one elastic ring (30,40) is rotatable relative to said spool (18).

6. The apparatus as defined in claim 2, wherein said at least one winding (19,20) is elastically braced in a clasp-like manner and compressed by said at least one elastic ring (30,40) during cutting operation at normal rotational speed.

7. The apparatus as defined in claim 6, wherein each of said at least one elastic ring (30,40) is provided with a continuous, radially extending, axially obliquely extending slit (47,48) in a circumference of said at least one throughgoing opening (31,41) for radial passage of said cutting filament therethrough.

8. The apparatus as defined in claim 2, wherein said at least one elastic ring (30,40) is engaged in said at least one lateral radial opening (13,15) of said cup so as to positively restrain said at least one elastic ring (30,40), at least in the vicinity of said at least one lateral radial opening (13,15) of said cup.

9. The apparatus as defined in claim 2, wherein said at least one elastic ring (30,40) is open and acts on said at least one winding (19,20) with said at least two legs (32,33; 42,43).

10. The apparatus as defined in claim 2, wherein said at least one elastic ring (30,40) has a radial protrusion (36,46) circumferentially disposed around said at least one throughgoing opening (31,41) of said at least one elastic ring (30,40).

11. The apparatus as defined in claim 2, wherein said means for readjusting said cutting filament to a predetermined length includes means for rotation of said drive shaft and said cup at an elevated rpm which is higher than a normal rpm used during cutting and said at least two elastic legs (32,33; 42,43) of said at least one elastic ring (30,40) have an elasticity such that said two elastic legs (32,33,42, 43) are released from engagement with said at least one winding (19,20) at said elevated rpm for filament readjustment, but engage and restrain said at least one winding (19,20) at said normal rpm.

12. An apparatus for cutting plants, said apparatus comprising
    a spool (18) rotatable about a rotation axis (28) and comprising a central hub (29) and three axially spaced-apart disks (23,24,25) extending from said central hub so as to define two winding chambers (26,27);
    a winding (19,20) around the central hub located in each of said winding chambers (26,27), each of said windings comprising a cutting filament (21,20) having a free end extending radially outward;
    a cup (16) nonrotatably connected with a drive shaft (14) and provided with two lateral radial openings (13,15) on opposite sides of said cup, wherein said spool is rotatably mounted in said cup and said cutting filaments pass through and extend from respective ones of said radial openings (13,15) of said cup; and
    means for readjusting each of said cutting filaments to a predetermined length when shortening due to wear has occurred, said means for readjusting including one elastic ring (30) engaged around one (19) of said windings (19,20) in said spool, said one elastic ring (30) having two elastic legs (32,33) and a middle portion between said two elastic legs (32,33) provided with a throughgoing opening (31) through which said free end of said one of said windings passes; another elastic ring (40) engaged around another (20) of said windings (19,20), said another elastic ring (40) having two elastic legs (42,43) and a middle portion between said two elastic legs (42,43) provided with another throughgoing opening (41) through which said free end of said another of said windings passes, and means for rotating said drive shaft and said cup at an elevated rpm relative to a normal rpm used during cutting;

wherein said two elastic legs (32,33,42,43) of said elastic rings (30,40) have an elasticity such that said two elastic legs (32,33,42,43) are released from engagement with said windings (19,20) at said elevated rpm for filament readjustment but engage and restrain said windings (19,20) at said normal rpm.

13. The apparatus as defined in claim 12, wherein said elastic rings (30,40) are axially braced with said at least two elastic legs (32,33; 42,43) between said disks (23,24,25) defining said winding chambers (26,27) with so little axial play that said elastic rings are secured against tilting.

14. The apparatus as defined in claim 12, wherein said elastic rings (30,40) are provided with tubular protrusions (36,46) around said throughgoing openings (31,41) and said elastic rings (30,40) engage around said windings (19,20) in said spool with said tubular protrusions in respective ones of said radial openings (13,15) in said cup.

\* \* \* \* \*